UNITED STATES PATENT OFFICE.

RUDOLF TAMBACH, OF LUDWIGSHAFEN-ON-THE-RHINE, GERMANY, ASSIGNOR, BY MESNE ASSIGNMENTS, TO THE CHEMICAL FOUNDATION, INC., A CORPORATION OF DELAWARE.

PROCESS FOR PRODUCING TANNATE-LIME COMPOUND DIFFICULTLY SOLUBLE IN DILUTE ACIDS.

1,352,768.     Specification of Letters Patent.     Patented Sept. 14, 1920.

No Drawing.     Application filed March 10, 1917. Serial No. 153,984.

*To all whom it may concern:*

Be it known that I, RUDOLF TAMBACH, a subject of the German Emperor, residing at Bleichstrasse 97, in the city of Ludwigshafen-on-the-Rhine, German Empire, have invented a new and useful Process for Producing a Tannate-Lime Compound Difficultly Soluble in Dilute Acids, of which the following is a specification.

In my U. S. patent application 112194 filed 29 July, 1916, is described a process for producing a tannate of lime compound which is difficultly soluble in dilute acids, said process consisting in heating, by itself, to a higher temperature, basic tannate of calcium produced in known manner, after it has been dried in contact with the air.

Now it has been found that the tannate of lime compound which is difficultly soluble in dilute acids can be obtained in a technically simpler manner by heating tannic acid solutions with the quantity of calcium hydroxid requisite for the formation of basic tannate of calcium until the desired degree of insolubility of the basic tannate of calcium in dilute acids is obtained.

Example.

2 kg. of calcium hydroxid are heated to about 100° C. with a solution of 5 kg. of tannic acid in 25.1 of water for six hours until, upon test of the product of reaction, said product is found to dissolve with difficulty in dilute acid. The product is then filtered, washed with water, dried, powdered and screened.

The duration of the heating and the temperature employed may vary within wide limits. The details given in the above example represent the preferred way of carrying out the process.

The product produced in this manner is also basic tannate of calcium, but it is difficultly soluble in dilute acids. If this product is treated with acids of a strength corresponding with that of human gastric juice 40% of the same will remain insoluble. This comparative insolubility in dilute acids is of special importance in the treatment of dysentery. It gives off lime and tannic acid throughout the entire length of the bowels.

What I claim and desire to secure by Letters Patent of the United States is:—

1. The process for producing basic tannate of calcium which consists in heating a solution of calcium hydroxid, tannic acid and water for such a period as to render the product difficult in dissolving in dilute acid, filtering the product thus produced, washing the same with water and then drying and finally powdering and screening the product.

2. The process for producing basic tannate of calcium which consists in heating a solution comprising 2 kg. of calcium hydroxid, 5 kg. of tannic acid and 25.1 of water to about 100° C. for a period of about six hours or until a test of the product of reaction will be found to difficultly dissolve in dilute acid, filtering the product and washing it with water, and then drying the product and powdering and screening the same.

DR. RUDOLF TAMBACH.